US010683640B2

(12) United States Patent
Carlson et al.

(10) Patent No.: US 10,683,640 B2
(45) Date of Patent: Jun. 16, 2020

(54) HYDRAULIC OIL COOLING SYSTEM

(71) Applicant: Great Plains Manufacturing, Inc., Salina, KS (US)

(72) Inventors: Jason Carlson, Lindsborg, KS (US); Toshihiko Takemura, Grapevine, TX (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

(21) Appl. No.: 16/138,431

(22) Filed: Sep. 21, 2018

(65) Prior Publication Data

US 2020/0095750 A1 Mar. 26, 2020

(51) Int. Cl.

| | |
|---|---|
| ***B60K 11/06*** | (2006.01) |
| ***E02F 9/22*** | (2006.01) |
| ***F15B 21/042*** | (2019.01) |
| *F01P 1/06* | (2006.01) |
| *F01P 3/18* | (2006.01) |

(52) U.S. Cl.

CPC ............ *E02F 9/226* (2013.01); *F15B 21/042* (2013.01); *F01P 1/06* (2013.01); *F01P 3/18* (2013.01); *F01P 2070/50* (2013.01); *F01P 2070/52* (2013.01)

(58) Field of Classification Search

CPC ..... F15B 21/0423; F01P 3/18; F01P 2070/52; B60K 11/06

See application file for complete search history.

(56) References Cited

U.S. PATENT DOCUMENTS

| | | | | |
|---|---|---|---|---|
| 3,934,644 A * | 1/1976 | Johnston | B60K 11/04 165/51 |
| 4,815,550 A * | 3/1989 | Mather | B60K 11/00 123/41.49 |
| 6,092,616 A * | 7/2000 | Burris | B60K 11/04 180/68.1 |
| 9,586,473 B2 * | 3/2017 | Pfohl | F01P 5/043 |
| 2015/0168089 A1 * | 6/2015 | Brinkley | F28F 27/02 165/11.1 |

OTHER PUBLICATIONS

Part Manual PM-RAD-A US; Auxiliary Oil Cooler Kit for Skid Steer (Ref. 600000416-00), Aug. 2, 2018, 3 pages.

Loftness Universal Hydraulic Oil Cooler Owner's Manual (Originating w/Serial No. 50-403), N14882 Rev. E, May 2, 2017, Hector, MN, 32 pages.

* cited by examiner

*Primary Examiner* — F Daniel Lopez

(74) *Attorney, Agent, or Firm* — Hovey Williams LLP

(57) ABSTRACT

A hydraulic cooling system for a heavy-equipment machine, with the heavy-equipment machine including a frame supported on the ground by a ground-drive assembly, a cab extending upward from the frame, and an attachment tool for performing work. The hydraulic cooling system comprises a main housing and a cooling assembly housed at least partly within the main housing, with the cooling assembly being configured to reduce a temperature of hydraulic oil flowing through the hydraulic cooling system. The hydraulic cooling system further comprises an attachment assembly for attaching the main housing to the cab of the heavy-equipment machine. The main housing is configured to extend rearward from the cab.

17 Claims, 15 Drawing Sheets

HYDRAULIC OIL COOLING SYSTEM

FIELD

Embodiments of the present invention are directed to a hydraulic oil cooling system. In more detail, embodiments of the present invention are directed to a hydraulic oil cooling system for use with heavy-equipment machines.

BACKGROUND

Many types of heavy-equipment machines, such as tractors or skid-steer loaders, include a hydraulic system (1) for facilitating movement (e.g., via a ground-drive assembly) of the machines, (2) for actuating components of the machines (e.g., via cylinder-actuated lift arms), and/or (3) for operating attachment tools associated with the machines. For example, certain skid-steer loaders can include a ground-drive assembly with a hydrostatic transmission that use hydraulic power to generate movement of the skid-steer loader (e.g., via wheels or tracks). Such hydraulic power is also commonly used to actuate the lift arms of the skid-steer loader. Furthermore, certain attachment tools that can be associated with the skid-steer loader may use the skid-steer loader's hydraulic system to enable operation of the attachment tools. Examples of such attachment tools include brooms, augers, rotary cutters, tillers, mulchers, rock wheels, stump grinders, breakers, vibratory rollers, or the like.

Generally, a hydraulic system for a skid-steer loader will include a primary cooling system for cooling the hydraulic oil that is used during movement of the skid-steer loader. Such cooling is required as the hydraulic oil becomes heated due to use by the skid-steer loader's ground-drive assembly. However, when the skid-steer loader uses an attachment tool that requires a significant amount of hydraulic power to operate (i.e., a high oil flow demand), the primary cooling system may be inadequate to maintain the hydraulic oil at a sufficiently-cool operating temperature. In such cases, certain previously-used skid-steer loaders have been known to include a secondary cooling system that functions to cool the hydraulic oil when the skid-steer loader use attachment tools. However, such previously-used secondary cooling systems have numerous drawbacks.

For instance, such previously-used secondary cooling systems would generally be positioned on a top of the skid-steer loader, such as on top of a cab of the skid-steer loader. In such cases, the secondary cooling systems would extend significantly above the skid-steer loader, which would inhibit overhead clearance of the skid-steer loader and restrict movement in confined spaces. In addition, positioning the secondary cooling systems on the cab of the skid-steer loader can inhibit air flow through the secondary cooling system, which decreases cooling efficiency and can generate high back pressures. Finally, positioning the secondary cooling systems on the cab of the skid-steer loader makes it difficult to access the secondary cooling system for maintenance, cleaning, and the like.

SUMMARY

Embodiments of the present invention include a hydraulic cooling system for a heavy-equipment machine, with the heavy-equipment machine including a frame supported on the ground by a ground-drive assembly, a cab extending upward from the frame, and an attachment tool for performing work. The hydraulic cooling system comprises a main housing and a cooling assembly housed at least partly within the main housing, with the cooling assembly being configured to reduce a temperature of hydraulic oil flowing through the hydraulic cooling system. The hydraulic cooling system further comprises an attachment assembly for attaching the main housing to the cab of the heavy-equipment machine. The main housing is configured to extend rearward from the cab.

Embodiments of the present invention also include a skid-steer loader comprising a frame, a ground-drive assembly configured to support the frame on the ground, and a cab extending upward from the frame. The skid-steer loader additionally comprises a loader attachment for performing work. The skid-steer loader further comprises a hydraulic cooling system including a main housing and a cooling assembly housed at least partly within the main housing. The cooling assembly is configured to reduce a temperature of hydraulic oil flowing through the hydraulic cooling system. The hydraulic cooling system further includes an attachment assembly for attaching the main housing to the cab of the skid-steer loader. The main housing is configured to extend rearward from the cab.

Embodiments of the present invention further include a method of integrating a hydraulic cooling system with a heavy-equipment machine. The heavy-equipment machine includes a frame supported on the ground by a ground-drive assembly, a cab extending upward from the frame, and an attachment tool for performing work. The method comprises a step of securing an attachment assembly to a roof of the cab of the heavy-equipment machine. The method additionally comprises a step of attaching a main housing to the attachment assembly, with the main housing including a cooling element and one or more fans housed therein. Upon the attaching step, the main housing extends rearward form the cab of the heavy-equipment machine. The method further includes a step of hydraulically connecting the hydraulic cooling system to a hydraulic system of the heavy-equipment machine.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 14:
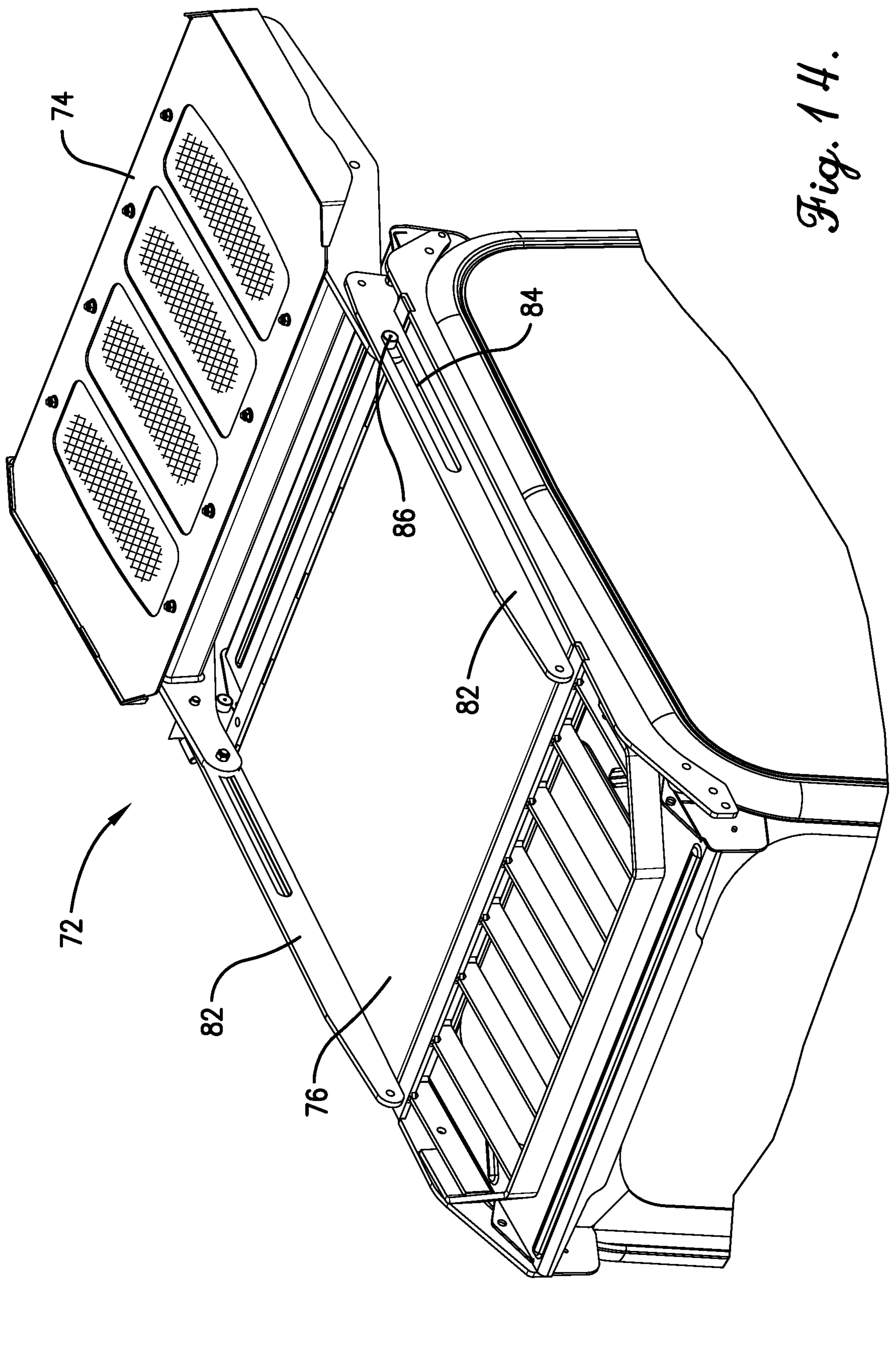
Figure 15:
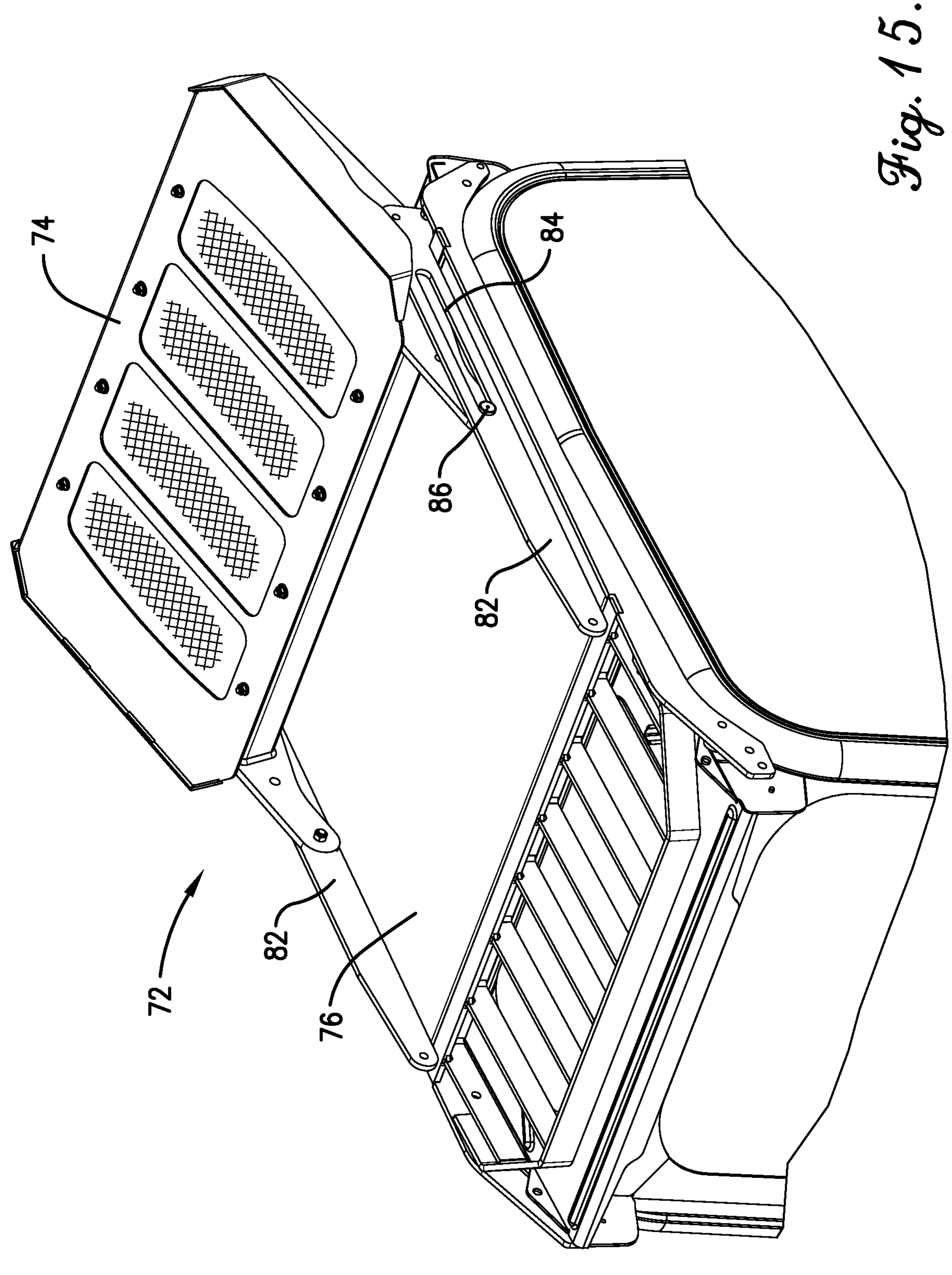

FIG. 14. is a perspective view of a portion of a cab from a heavy-equipment machine, with the cab including another hydraulic cooling system according to embodiments of the present invention, and with the hydraulic cooling system being in a normal operating configuration; and FIG. 15. is a perspective view of the cab and hydraulic cooling system from FIG. 14, with the hydraulic cooling system being in a maintenance configuration.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
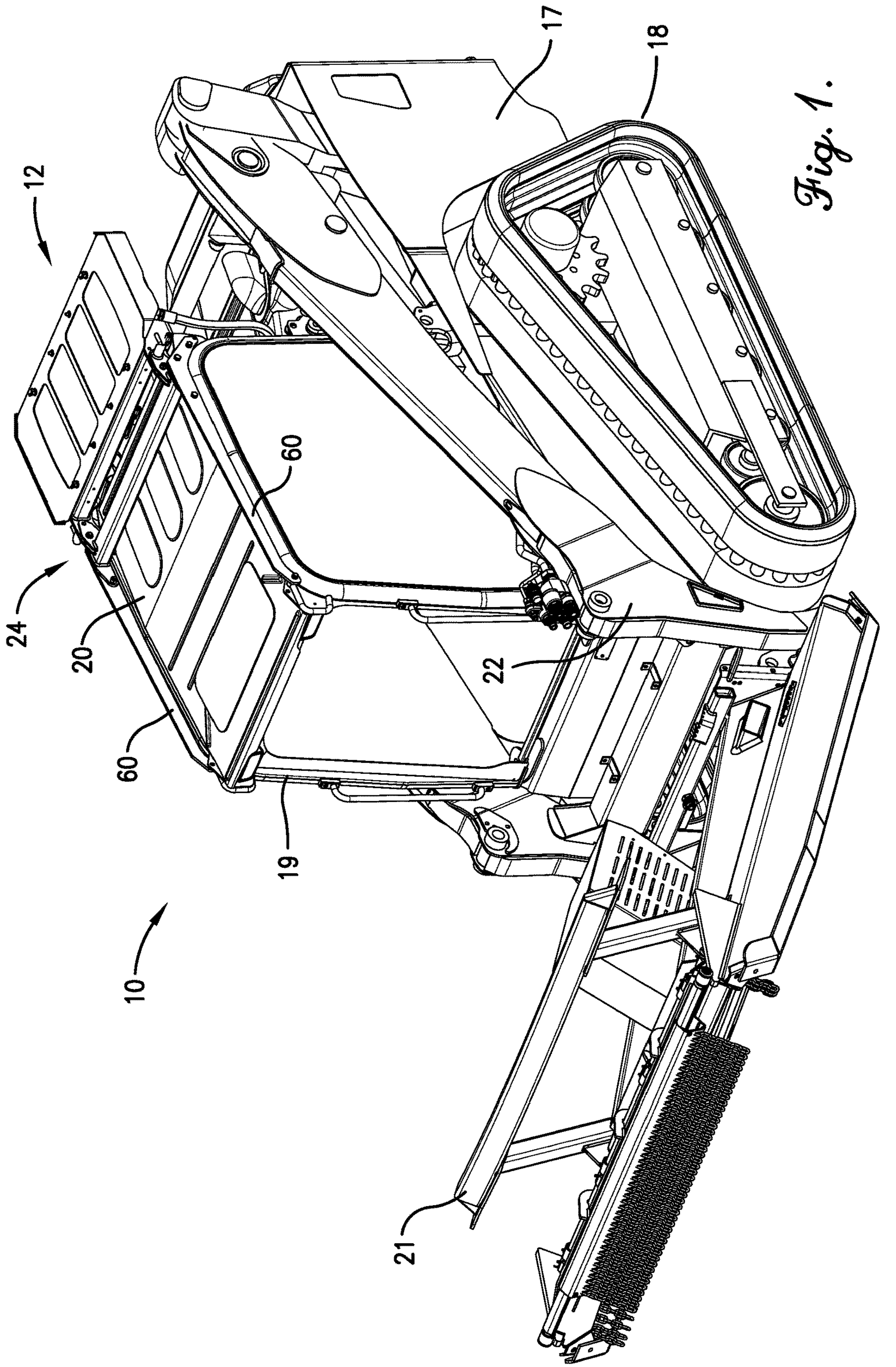
FIG. 1 is a front perspective view of a heavy-equipment machine with a hydraulic cooling system extending rearward from a cab of the heavy-equipment machine according to embodiments of the present invention.
Figure 2:
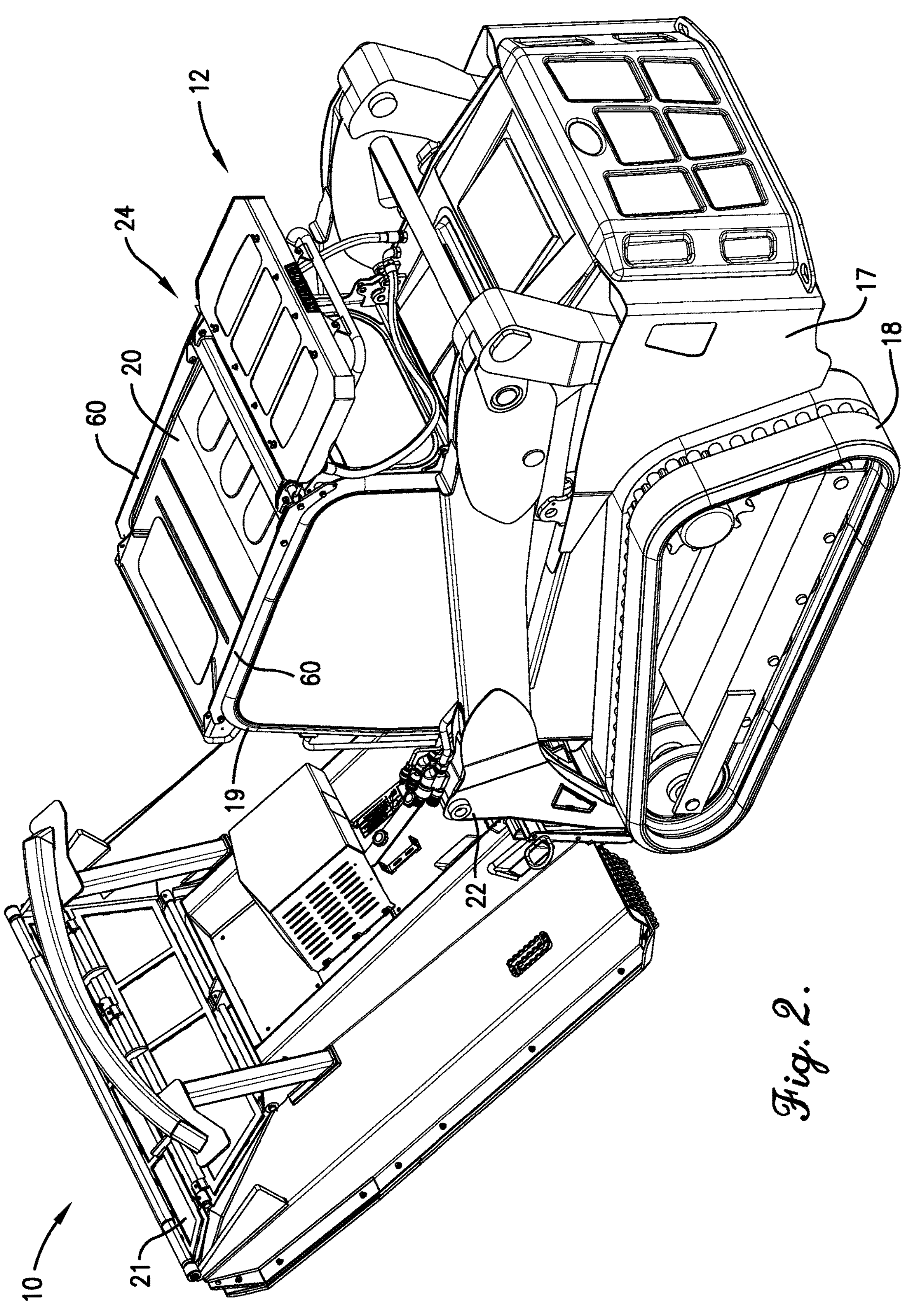
FIG. 2 is rear perspective view of the heavy-equipment machine and hydraulic cooling system from FIG. 1.

Referring now to the drawings, FIGS. 1 and 2 illustrate a heavy-equipment machine in the form of a skid-steer loader 10 with a hydraulic cooling system 12 according to embodiments of the present invention. As will be described in more detail below, the hydraulic cooling system 12 is configured to cool (i.e., reduce the temperature of) the hydraulic oil used by the loader 10. Although the figures and the below description discuss the hydraulic cooling system 12 being used with a skid-steer loader (e.g., loader 10), it should be understood that the hydraulic cooling system 12 may be used with other types of heavy-equipment machines, such as tractors, wheel loaders, bulldozers, excavators, trenchers, drilling machines, and the like.

Figure 3:
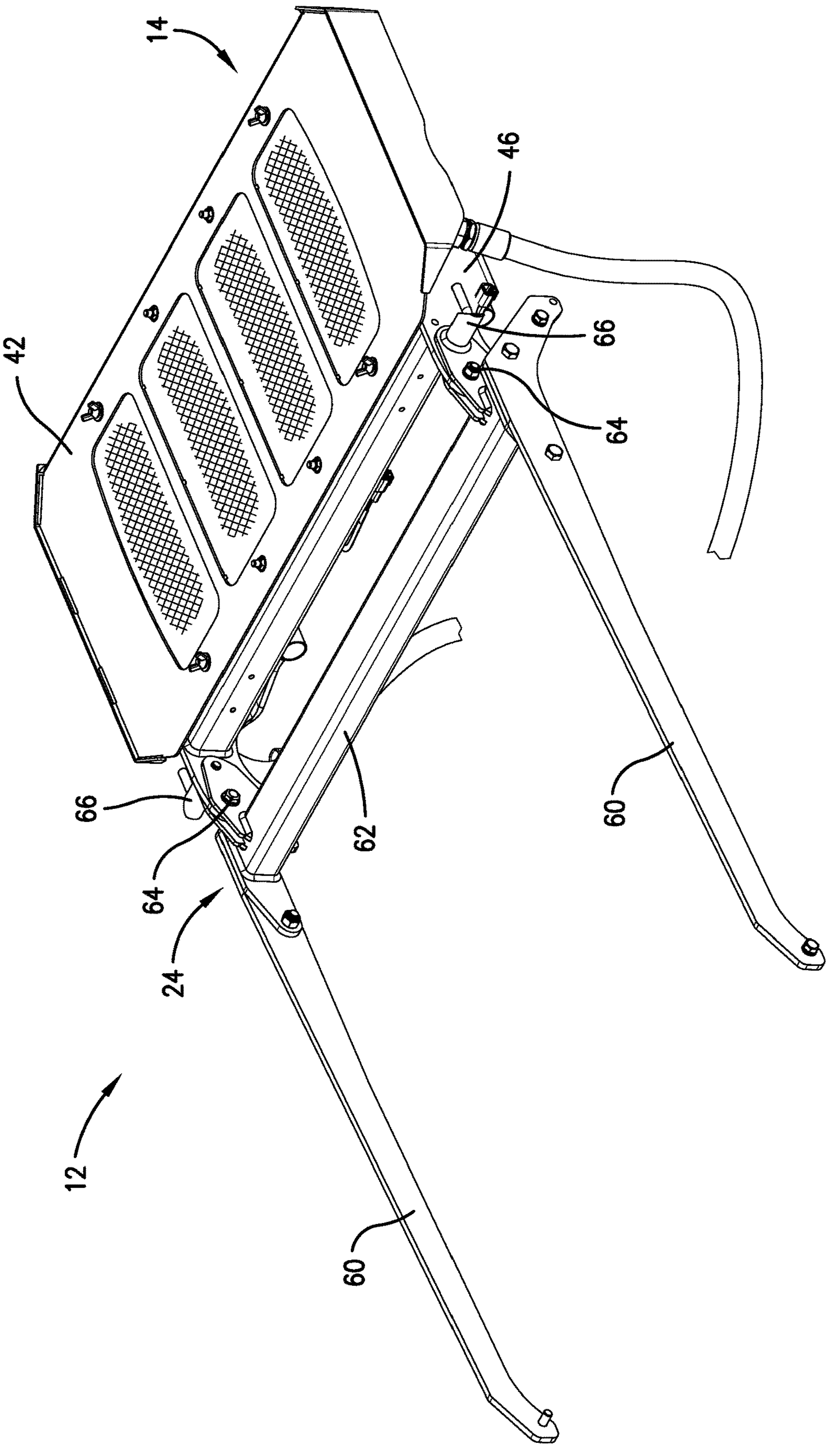
FIG. 3 is a top, front perspective view of the hydraulic cooling system from FIGS. 1 and 2.
Figure 4:
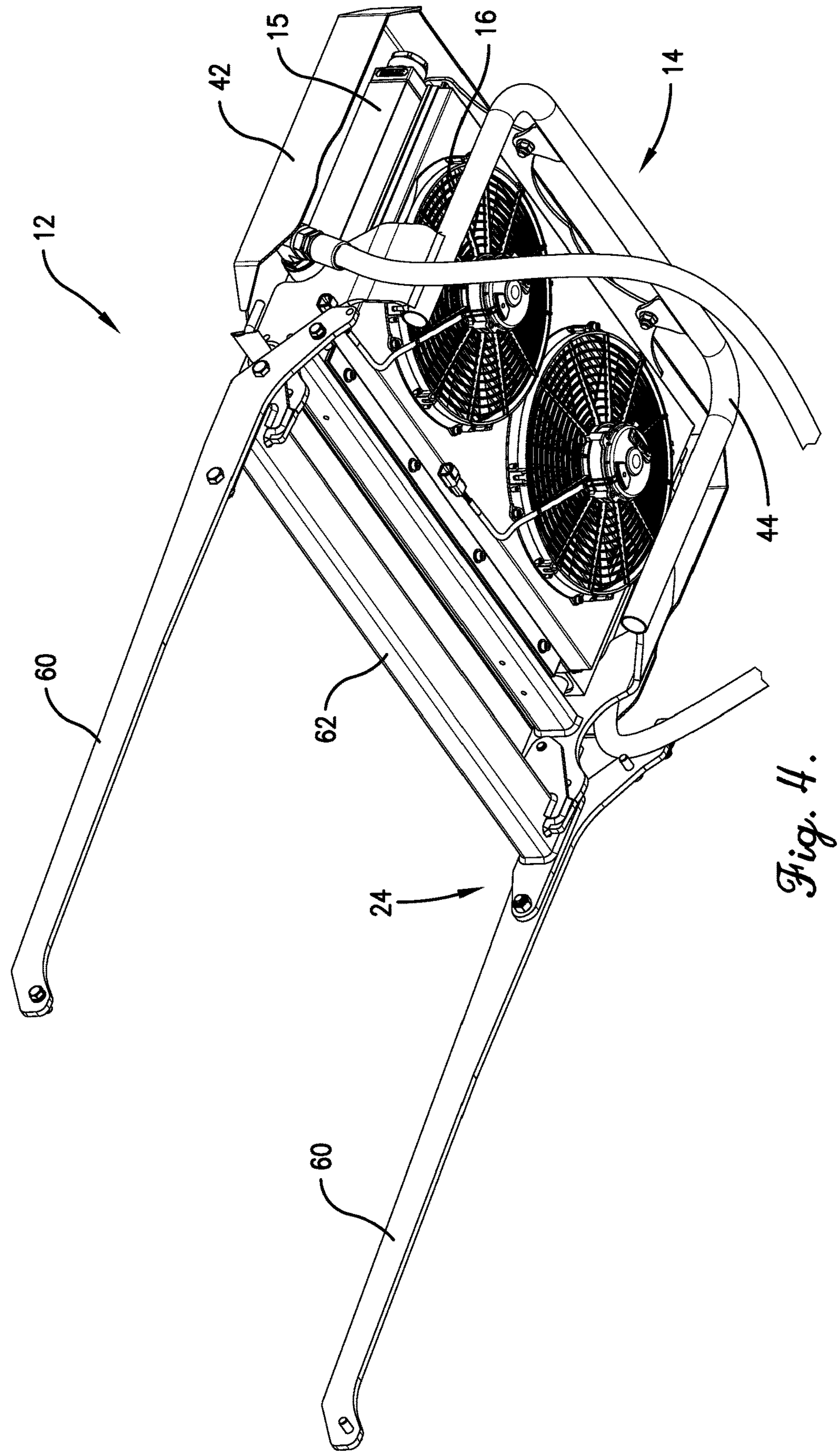
FIG. 4 is a bottom, front perspective view of the hydraulic cooling system from FIG. 3.
Figure 5:
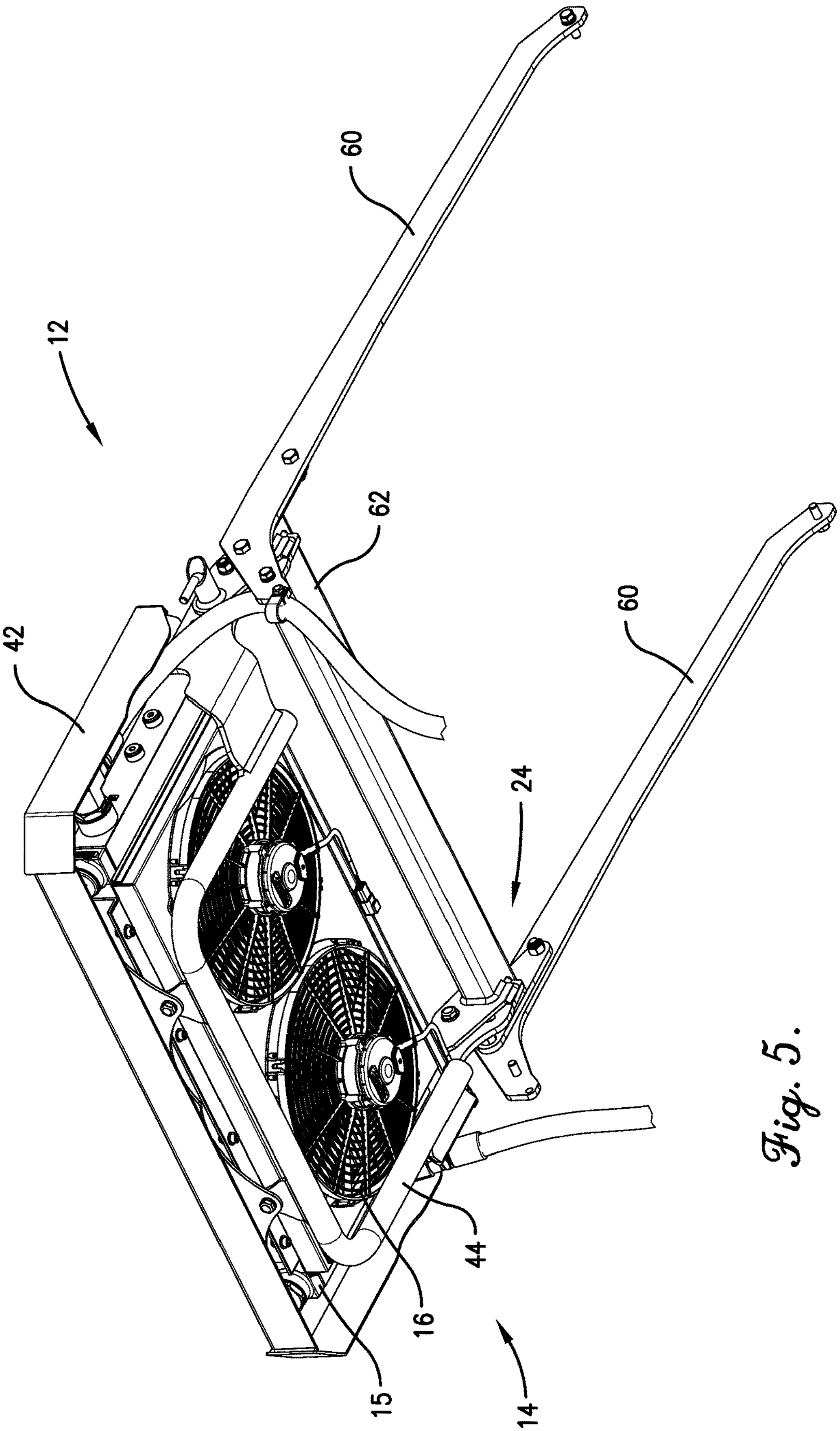
FIG. 5 is a bottom, rear perspective view of the hydraulic cooling system from FIGS. 3 and 4.

Broadly, and with reference to FIGS. 3-5, the hydraulic cooling system 12 comprises a main housing 14 that houses a cooling assembly for reducing the temperature (i.e., cooling) of the hydraulic oil being used by the loader 10. The main housing 14 and the cooling assembly are shown in more detail in FIGS. 6 and 7. In some embodiments, the cooling assembly may comprise a cooling element 15 in the form of a radiator for passing hydraulic oil therethrough. The cooling assembly may further comprise one or more fans 16 for directing airflow across and/or through the cooling element.

As noted above, the hydraulic cooling system 12 can be used on a heavy-equipment machine, such as the loader 10 shown in FIGS. 1 and 2. As such, the loader 10 may comprise a frame 17, a ground-drive assembly 18 supporting the frame 17 on the ground, and a cab 19 extending upward from the frame 17. The ground-drive assembly 18 may comprise a plurality of wheels and/or tracks (i.e., a tracked loader 10 is shown in FIGS. 1 and 2). The cab 19 comprises a framed housing within which an operator of the loader 10 can be positioned while operating the loader 10. In general, a front of the cab 19 is open to allow the operator to enter and exit the cab 19. Sides of the cab 19 generally comprise glass or plastic through which the operator can see while operating the loader 10. A roof 20 of the cab 19 can be made from a structurally strong material so as to provide a safe working environment while the operator is operating the loader 10. Nevertheless, in some embodiments the roof 20 of the cab 19 may include porthole type windows that permit the operator to view above the loader 10.

The loader 10 can be associated with various types of loader attachments 21, which are tools or implements for performing various types of work functions. For example, the loader 10 shown in FIGS. 1 and 2 includes a loader attachment 21 in the form of a rotary cutter attachment for cutting vegetation growing from the ground. The loader attachment 21 can be attached to a front of the loader 10, and specifically to lift arms 22 of the loader for raising and lowering the loader attachment 21. As will be described in more detail below, many loader attachments 21 operate under hydraulic power. As such, these loader attachments 21 will be connected with the loader's 10 hydraulic system. As used herein, the terms "front," "forward," or "forwardly" mean a direction toward the loader attachment 21, whereas the terms "back," "rear," "rearward," or "rearwardly" mean a direction away from the loader attachment 21. Correspondingly, the term "longitudinally" means a direction along a length of the loader 10 (i.e., from front to back), while the term "laterally" means a direction from side to side of the loader 10 (i.e., perpendicular to a front and back direction).

As shown in FIGS. 1 and 2, embodiments provide for the hydraulic cooling system 12 to be attached to the cab 19 of the loader 10. In some embodiments, the hydraulic cooling system 12 may be attached to the roof 20 of the cab 19. In particular embodiments, the cooling system 12 may be secured to the cab 19 in such a manner that the main housing 14, including the cooling assembly housed therein, extends rearwardly from the cab 19. Such securement to the cab 19 may be facilitated by an attachment assembly 24 that may form part of the hydraulic cooling system 12, as shown in FIGS. 1-5. In some embodiments, the attachment assembly 24 may, as will be described in more detail below, facilitate connection of the main housing 14 to the cab 19, while providing that no portion of the hydraulic cooling system 12 extends more than a particular distance above a maximum height of the loader 10 and/or the cab 19 of the loader 10.

Figure 8:
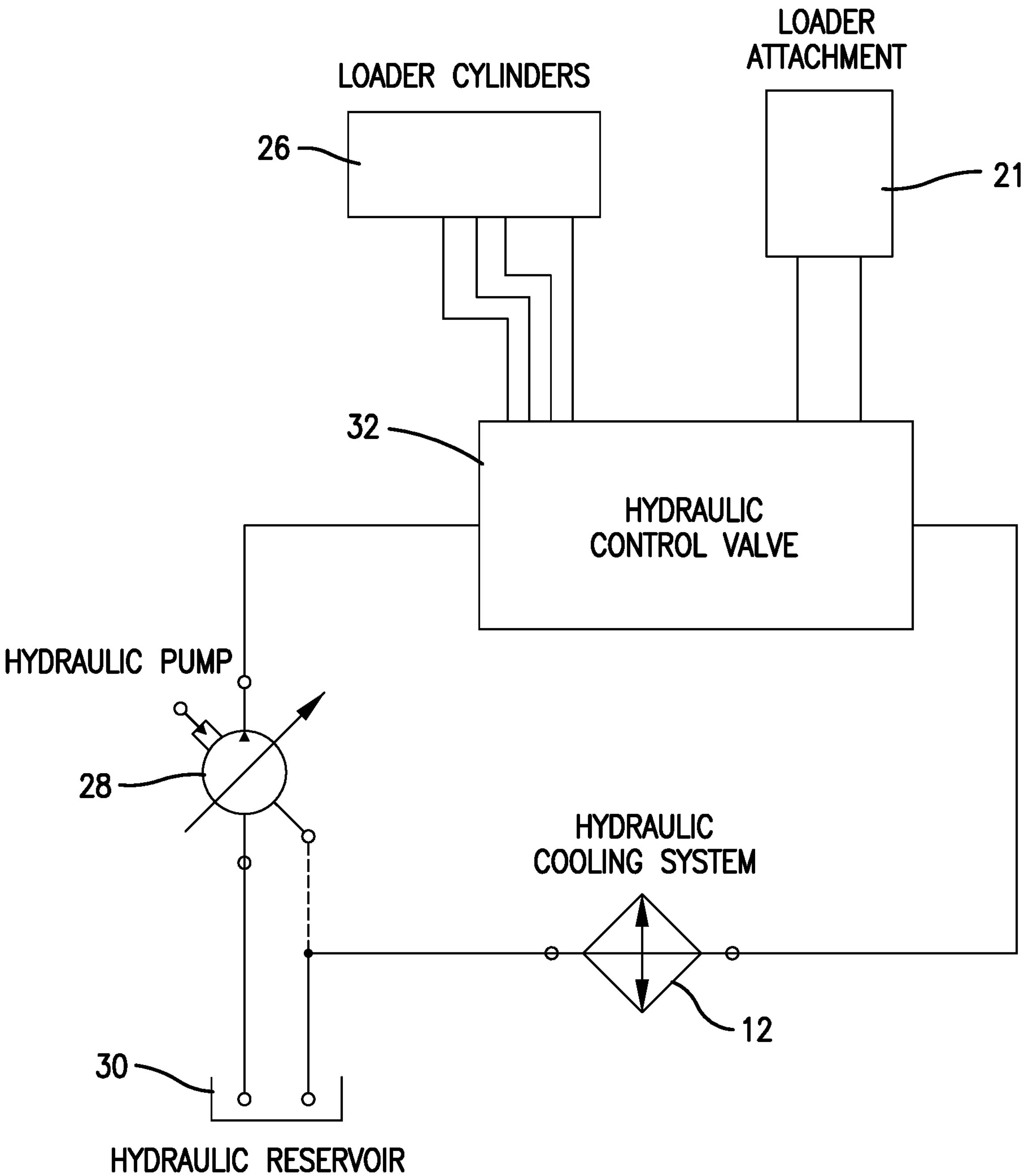
FIG. 8 is a schematic diagram of an auxiliary hydraulic system in a heavy-equipment machine.

Turning more broadly to the hydraulic system of the loader 10, a hydraulic circuit diagram of the hydraulic system (which may be referred to as an auxiliary hydraulic system) is illustrated in FIG. 8. As shown, loader cylinders 26 (i.e., associated with the loader's 10 lift arms 22) are normally connected to the hydraulic system for purposes of actuating the lift arms 22. To facilitate such actuation, a hydraulic pump 28 can force hydraulic oil from a hydraulic reservoir 30 to the loader cylinders 26, via a hydraulic control valve 32, to actuate the loader cylinders 26. As was described previously, the loader 10 may be associated with various types of loader attachments 21 for performing varying types of work. Such loader attachments 21 can also be incorporated into the hydraulic system, such as via the hydraulic control valve 32, which can direct hydraulic oil to the loader attachments 21 for operation. In situations where the loader attachments 21 being used require a high demand for hydraulic oil (i.e., a high oil flow demand), the hydraulic oil in the loader's 10 hydraulic system can overheat. To address such overheating, embodiments of the present invention provide for the hydraulic cooling system 12 to be incorporated within the hydraulic system (as shown in the circuit diagram of FIG. 8) between the exit of the hydraulic control valve 32 and the entrance to the hydraulic reservoir 30.

Given the hydraulic system illustrated in FIG. 8, when the loader cylinders 26 and/or the loader attachment 21 are being used, hydraulic oil will be forced from the reservoir 30, via the hydraulic pump 28, to the entrance to the hydraulic control valve 32 for distribution to the loader cylinders 26 and/or the loader attachment 21. From the loader cylinders 26 and/or the loader attachment 21, the hydraulic oil will be passed from the exit of the hydraulic control valve 32 through the hydraulic cooling system 12 where the hydraulic oil is cooled (i.e., the temperature is reduced) before it is returned to the hydraulic reservoir 30.

Some skid-steer loaders, such as those with a ground-drive assembly 18 that includes a hydrostatic transmission, may also include a primary hydraulic cooling system associated with the ground-drive assembly. Generally, the ground-drive assembly will be hydraulically connected to the hydraulic reservoir 30 discussed above, such that the ground-drive assembly can share hydraulic oil with the load cylinders 26 and loader attachments 21. In such cases, the primary hydraulic oil cooling system will be configured to cool the hydraulic oil when the ground-drive assembly is being used (i.e., as the skid-steer loader is being driven/maneuvered). However, such a primary hydraulic oil cooling system will not generally function to cool the hydraulic oil when the ground-drive assembly is not being used (i.e., when the skid-steer loader is not being driven/maneuvered). This can be problematic when the skid-steer loader is using a loader attachment 21 that requires a high flow demand of hydraulic oil, as the loader attachment 21 can cause the hydraulic oil to overheat. Examples of loader attachments 21 that require a high flow demand of hydraulic oil include brooms, augers, rotary cutters, tillers, mulchers, rock wheels, stump grinders, breakers, vibratory rollers, or the like (FIGS. 1 and 2 shows the loader 10 having a high oil demand loader attachment 21 in the form of a rotary cutter), Beneficially, the hydraulic cooling system 12 of embodiments of the present invention overcomes such overheating issues by acting as a secondary hydraulic cooling system that can function to cool the temperature of the hydraulic oil (1) in instances where the loader 10 is not moving or being driven (i.e., the ground-drive assembly 18 is not being used), and/or (2) even while the loader 10 is moving or being driven, so as to supplement the cooling capability of the primary hydraulic cooling system. The cooling functionality of the hydraulic cooling system 12 will now be described in more detail.

FIGS. 3-7 illustrate the hydraulic cooling system 12 removed from the loader 10. As shown, the hydraulic cooling system 12 comprising the main housing 14, which at least partially houses cooling element 15 and the fan(s) 16. The main housing 14 may broadly comprise an upper housing section 42 and a lower housing section 44 that are rigidly coupled together to securely house the cooling element 15 and the fans 16 therein. The upper housing section 42 may comprise a generally rectangular frame with an open bottom and with a top surface having plurality of openings, such as opening provided by a grating-type material, through which fluid (e.g., air) can flow. As such, the fans 16 can generate an airflow upward from below the main housing 14, through the main housing 14 (and particularly through the cooling element 15), and out the main housing 14 through the openings (as provided by the grating-type material) at the top surface of the upper housing section 42. Alternatively, the fans 16 can generate an airflow downward from above the main housing 14 through the openings (as provided by the grating-type material) at the top surface of the upper housing section 42, through the main housing 14 (and particularly through the cooling element 15), and out the open bottom of the main housing 14.

Figure 6:
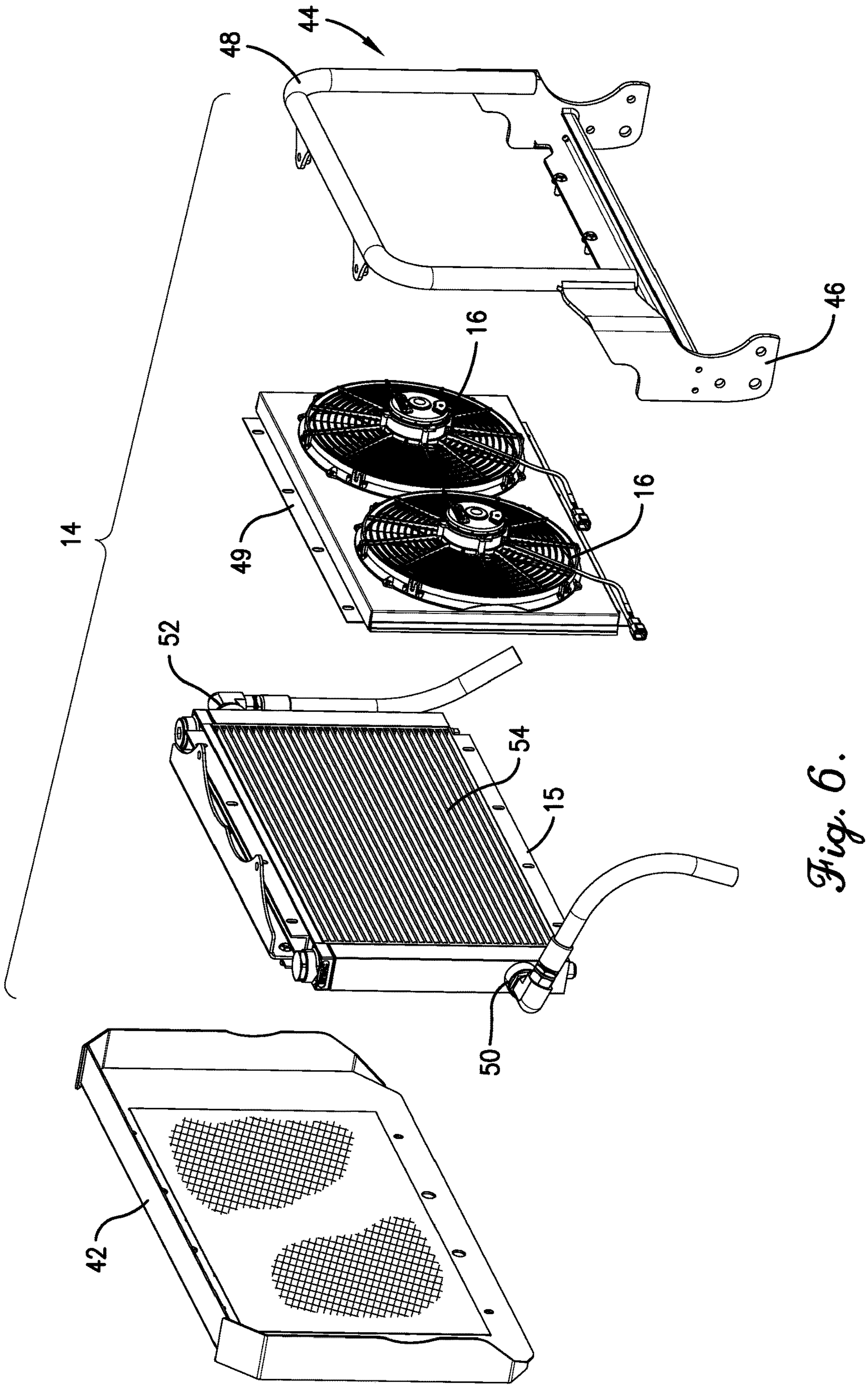
FIG. 6 is an exploded view of a main housing of the hydraulic cooling system from FIGS. 3-5.
Figure 7:
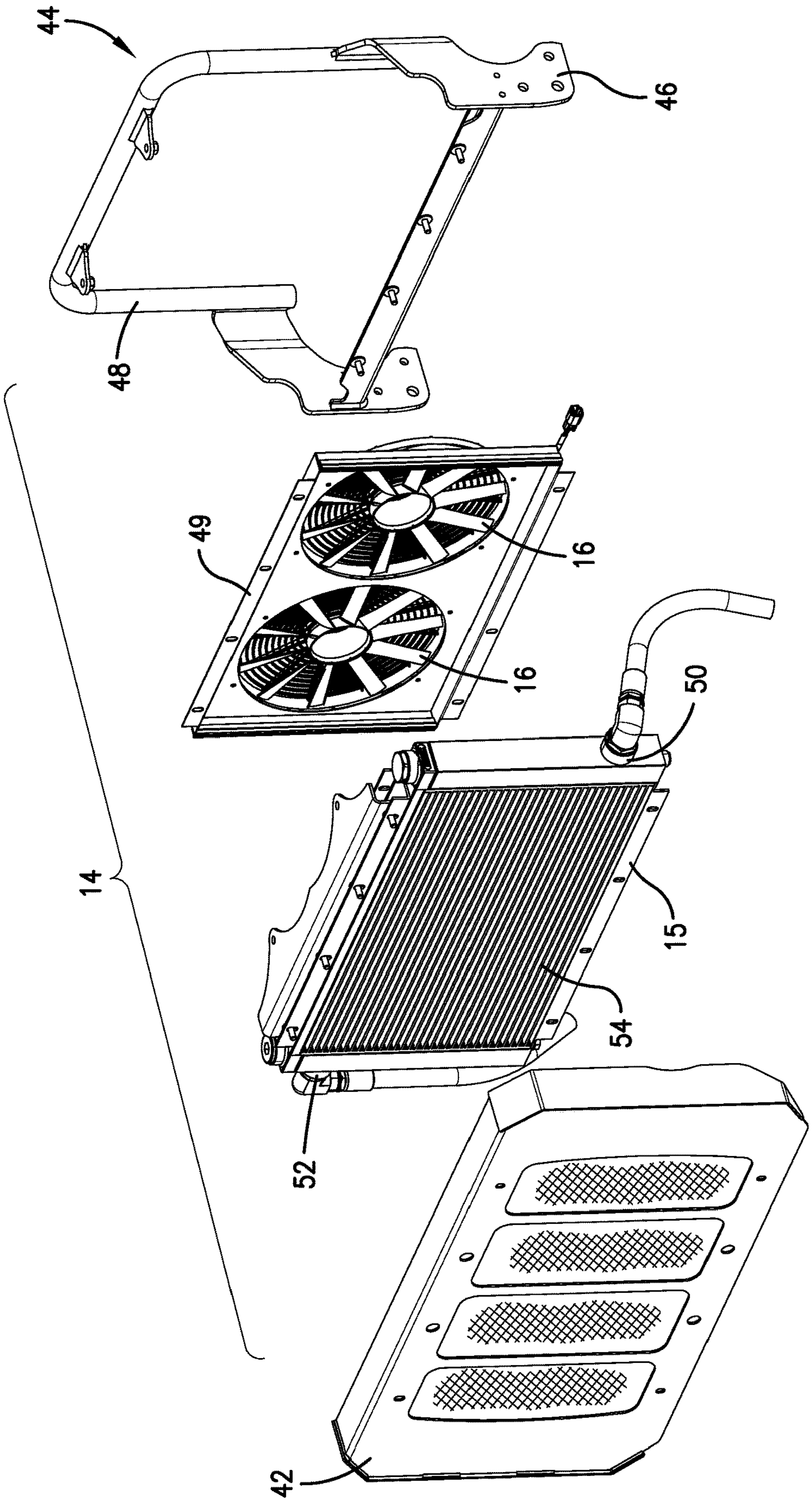
FIG. 7 is another exploded view of the main housing of the hydraulic cooling system from FIGS. 3-5.

With reference to FIGS. 6 and 7, the lower housing section 44 of the main housing 14 may comprise a base element 46 extending laterally about the front of the main housing 14, and a tubular support element 48 extending around side and rear portions of the main housing 14. The lower housing section 44 may be secured at various locations to the upper housing section 42 so as to provide reinforcement and structural support to the main housing 14, as well as to support the cooling element 15 and the fans 16 secured therein. In embodiments in which the lower housing section 44 includes the tubular support element 48, the lower housing section 44 may beneficially be used as a hand-hold support for purposes of transporting, actuating, and/or maneuvering the hydraulic cooling system 12 by a user/operator, as will be discussed in more detail below.

As was described above and as illustrated in the drawing figures, the hydraulic cooling system 12 may comprise the one or more fans 16 positioned within the main housing 14 below the cooling element 15. In the embodiments shown in the figures, the hydraulic cooling system 12 may include two fans 16 positioned adjacent to one another and directly below the cooling element 15. As such, the fans 16 can draw air from below or above the main housing 14 and direct such air across the cooling element 15 so as to capture heat from the cooling element 15 (and from the hydraulic oil flowing through the cooling element 15) via convection. The air passing through and/or past the cooling element 15 can exit the main housing 14 via the openings on the top surface of the upper housing section 42 or via the open bottom of the main housing 14. With reference to FIGS. 6 and 7, the fans 16 may be secured to the main housing 14 via fan frame 49, which may be in the form of a planar piece of material with through holes for supporting the fans 16 in a generally parallel relationship with the cooling element 15. In some embodiments, the fan frame 49 may be secured to an underside of the cooling element 15, such as via one or more fasteners. Alternatively, the fan frame 49 may be directly coupled, in a rigid manner, to the upper housing section 42 of the main housing 14.

The fans 16 may be electrical fans powered by an electrical power source of the loader 10, such as by a battery, alternator, or the like. As will be described in more detail below, the fans 16 may be selectively electrically connected to the battery via a switch controlled by a temperature sensor. As such, the fans 16 can be activated on demand, only when the temperature measured by the temperature sensor has exceeded a maximum temperature. For example, embodiments of the present invention may include an electronic controller connected to the fans 16 and to the temperature sensor. The operator of the loader 10 can designate, via the controller, a specific maximum operating temperature for the hydraulic oil. When the temperature sensor senses that the hydraulic oil has reached or exceeds the maximum operating temperature, the controller can automatically activate the fans 16 so as to begin cooling the hydraulic oil as it flows through the hydraulic cooling system 12. The controller may automatically deactivate the fans 16 upon detecting the temperature of the hydraulic oil has fallen below the maximum operating temperature. In other embodiments, the fans 16 may be selectively electrically connected to the battery via a manual switch controlled by the operator of the loader 10 so as to manually activate/de-activate the fans 16. In still other embodiments, the fans 16 may be continuously in connection with the electrical power source of the loader 10 so as to be continuously activated whenever the loader 10 is being operated.

The hydraulic cooling system 12 additionally comprises the cooling element 15, which is positioned within the main housing 14 above the fans 16. Broadly, the cooling element 15 may comprise a generally rectangular conduit for passing fluids and/or liquids, such as hydraulic oil, and for removing heat (i.e., cooling) from such fluids and/or liquids. As such, and as will be described in more detail below, the cooling element 15 may be in the form of a radiator. In more detail, and with reference to FIGS. 6 and 7, the cooling element 15 may comprise an inlet port 50 which may be connected, via hydraulic lines/hoses, to the hydraulic control valve 32 of the loader's 10 hydraulic system. The cooling element 15 may also comprise an outlet port 52 which may be connected, via hydraulic lines/hoses, to the hydraulic reservoir 30 of the loader's 10 hydraulic system. Between the inlet port 50 and the outlet port 52, the cooling element 15 may comprise a primary fluid conduit 54 for passing hydraulic oil therethrough. The fluid conduit 54 may comprise a plurality of individual pathways for circulating the hydraulic oil between the inlet port 50 and outlet port 52. In some embodiments, the pathways may be formed as fins for increasing the surface area of the fluid conduit 54. The fins may be spatially separated, so as to provide gaps through which air can pass (such as via air flow created by the fans 16). In some embodiments, the fluid conduit 54 may also include one or more interior turbulator elements for causing the hydraulic oil to flow turbulently through the fluid conduit 54, so as to enhance heat exchange characteristics and fluid flow properties of the cooling element 15.

In some embodiments, as will be described in more detail below, the cooling element 15 may further comprise a bypass valve (not shown) for diverting the flow of hydraulic oil. Specifically, the bypass valve may comprise a spring-loaded valve that is configured to crack when hydraulic oil reaches more than a threshold pressure above a standard operating pressure. In some embodiments, for instance, the bypass valve may be positioned adjacent to the inlet port 50 and may, when cracked, divert hydraulic oil from flowing through the fluid conduit 54 and, instead, cause the hydraulic oil to flow through a bypass channel (not shown). The bypass channel may act as a bypass pathway for the fluid conduit 54, such that hydraulic oil entering the inlet port 50 will be caused to flow through the bypass channel directly to the outlet port 52 without passing through the fluid conduit 54. As discussed below, the bypass valve may be actuated based on a pressure of the hydraulic oil within the cooling element 15, such as the pressure at the inlet port 50.

In more detail, embodiments of the present invention provide for the hydraulic cooling system 12 to include various functions and features that permit the hydraulic cooling system 12 to operate in a safe and efficient manner. For instance, the hydraulic cooling system 12 may, in some embodiments, include a temperature sensor (not shown) configured to measure a temperature of the hydraulic oil passing therethrough. The temperature sensor may be inserted within and/or otherwise associated with the cooling element 15 of the hydraulic cooling system 12. For instance, the temperature sensor may be positioned within the cooling element 15, such as adjacent the inlet port 50, the outlet port 52, or the fluid conduit 54. The temperature sensor may also be connected to a switch that can activate/deactivate (i.e., turn on and off) the one or more fans 16 of the hydraulic cooling system 12. Specifically, the switch may selectively connect the fans 16 to an electrical power source (not shown) associated with the loader 10, such as a battery, alternator, or the like. As such, the hydraulic cooling system 12 may be configured to only activate the fans 16 when the temperature of the hydraulic oil flowing through the hydraulic system and/or the hydraulic cooling system 12 exceeds a maximum temperature. In some embodiments, the maximum temperature may be 100° F., 125° F., 130° F., 140° F., 150° F., 160° F., 170° F., 175° F., 200° F., or more.

In addition to the temperature sensor, the hydraulic cooling system 12 may include the bypass valve, as previously described. As noted above, the bypass valve may be inserted within and/or otherwise associated with the cooling element 15 of the hydraulic cooling system 12. The bypass valve is configured to divert the flow of hydraulic oil from the fluid conduit 54 to the bypass channel in cases where the hydraulic cooling system 12 experiences a pressure overload. As such, the hydraulic cooling system 12 may be configured to divert hydraulic oil from flowing through the fluid conduit 54 when the pressure of the hydraulic oil within the hydraulic system and/or the hydraulic cooling system 12 exceeds a standard operating pressure by more than a maximum pressure threshold. In some embodiments, the maximum pressure threshold may be 20 p.s.i., 25 p.s.i., 30 p.s.i., 35 p.s.i., or 40 p.s.i.

Turning more broadly to the main housing 14, the main housing 14 may be secured to the cab 19 of the loader 10 via the attachment assembly 24 illustrated in FIGS. 3-5. With reference to FIGS. 1 and 2, the attachment assembly 24 may be secured to an upper portion of the cab 19, such as to the roof 20 of the cab 19. The attachment assembly 24 may be secured to the cab 19 by various methods of attachment, such as by fasteners (e.g., nut and bolt combination), welding, or the like. With the attachment assembly 24 secured to the cab 19, the attachment assembly 24 is configured to act as a bracket to engage with the main housing 14 so as to support the hydraulic cooling system 12 on the loader 10. Specifically, the attachment assembly 24 is configured to support the main housing 14 in extending rearward from a back side of the cab 19, as will be described in more detail below.

As illustrated in FIGS. 3-5, the attachment assembly 24 may, in some embodiments, comprise a pair of longitudinally-extending support arms 60. When the attachment assembly 24 is connected to the cab 19 of the loader, the support arms 60 are configured to extend along (from front to back) an upper side of the roof 20 of the cab 19. The support arms 60 may be secured to the roof 20 of the cab 19 by fasteners included at front and back portions of the support arms 60. Returning to FIGS. 3-5, the attachment assembly 24 may additionally comprise a laterally-extending base element 62, which extends between the support arms 60 near the back portions of the support arms 60. The base element 62 may be secured to the support arms 60 by fasteners, welding, or the like. Although the above-described attachment assembly 24 comprises a pair of longitudinally-extending support arms 60 and a laterally-extending base element 62, it should be understood that the attachment assembly 24 may include other configurations (or component combinations), such as a generally planar base plate secured to the roof 20 of the cab 19.

Embodiments of the present invention provide for the main housing 14 to be rotatably secured to the attachment assembly 24. Specifically, as perhaps best illustrated in FIG. 3, a front portion of the housing 14 (e.g., the base element 46) may be secured to a rear portion of the attachment assembly 24 (i.e., the base element 62) via a pair of pivot elements 64. The pivot elements 64 may each comprise a pair of bushings that are clamped together via a nut and bolt combination. As such, the pivot elements 64 may act as pivot pins that permits the housing 14 to rotate with respect to the attachment assembly 24. The main housing 14 may be held securely in position with respect to the attachment assembly 24 via a pair of hitch pins 66. In some embodiments, the hitch pins 66 may be retractable and spring-loaded, such that they are not entirely removable from the main housing 14 and/or the attachment assembly 24. For example, the hitch pins 66 may comprise a handle and an outer cam surface, such that the handle can be rotated so as to follow the cam surface. Rotating the handle in a first direction causes the handle to follow the cam surface, such that the hitch pins 66 are effectively retracted from the main housing 14 and/or the attachment assembly 24. Rotating the handle in a second direction causes the handle to follow the cam surface, such that the hitch pins 66 are effectively re-inserted within the main housing 14 and/or the attachment assembly 24. In other embodiments, the hitch pins 66 may be entirely removable from the main housing 14 and/or the attachment assembly 24.

Figure 9:
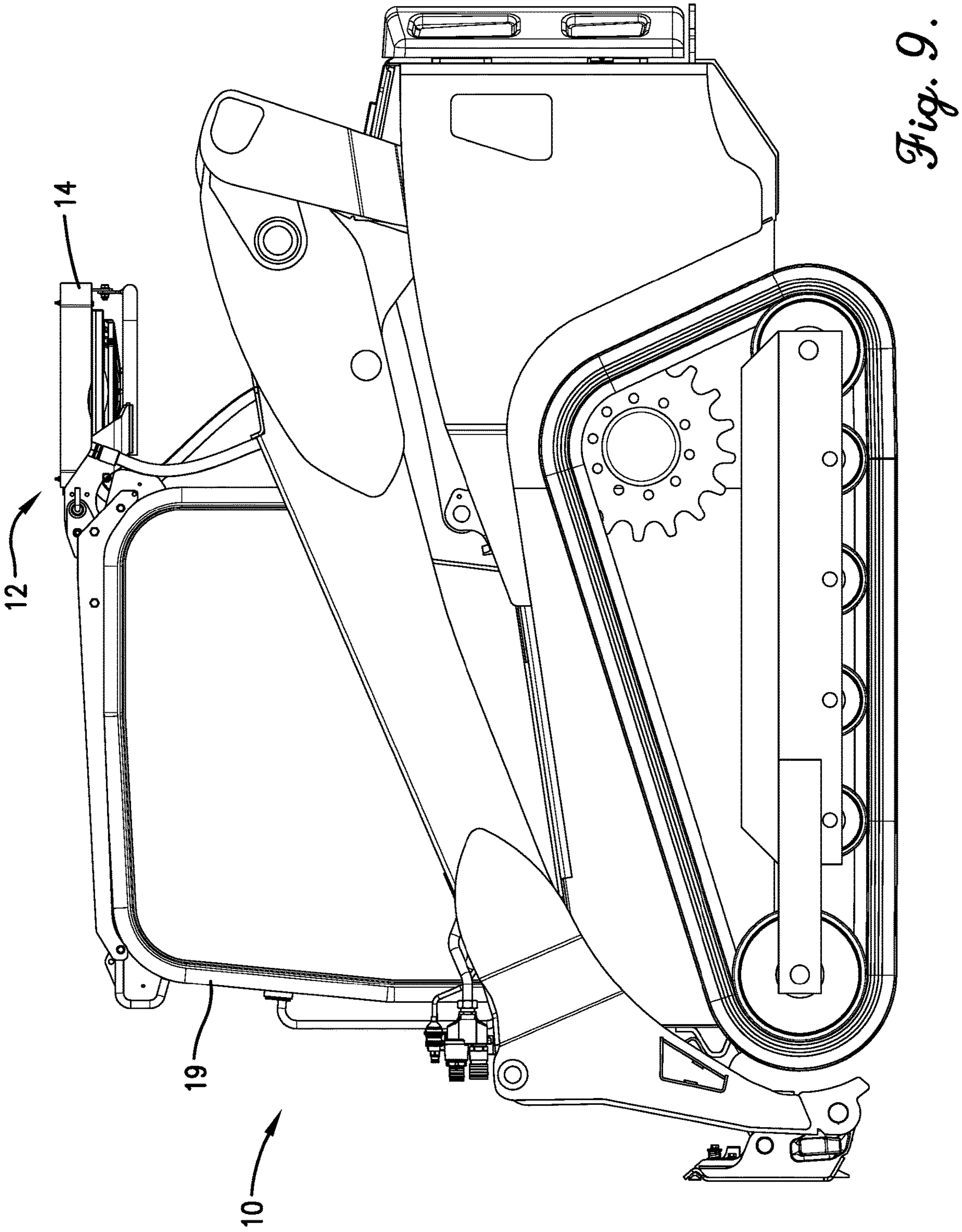
FIG. 9 is a side elevation view of the heavy-equipment machine and hydraulic cooling system from FIG. 1, with the heavy-equipment machine not including an attachment tool, and with the hydraulic cooling system being positioned in a normal operating configuration.
Figure 10:
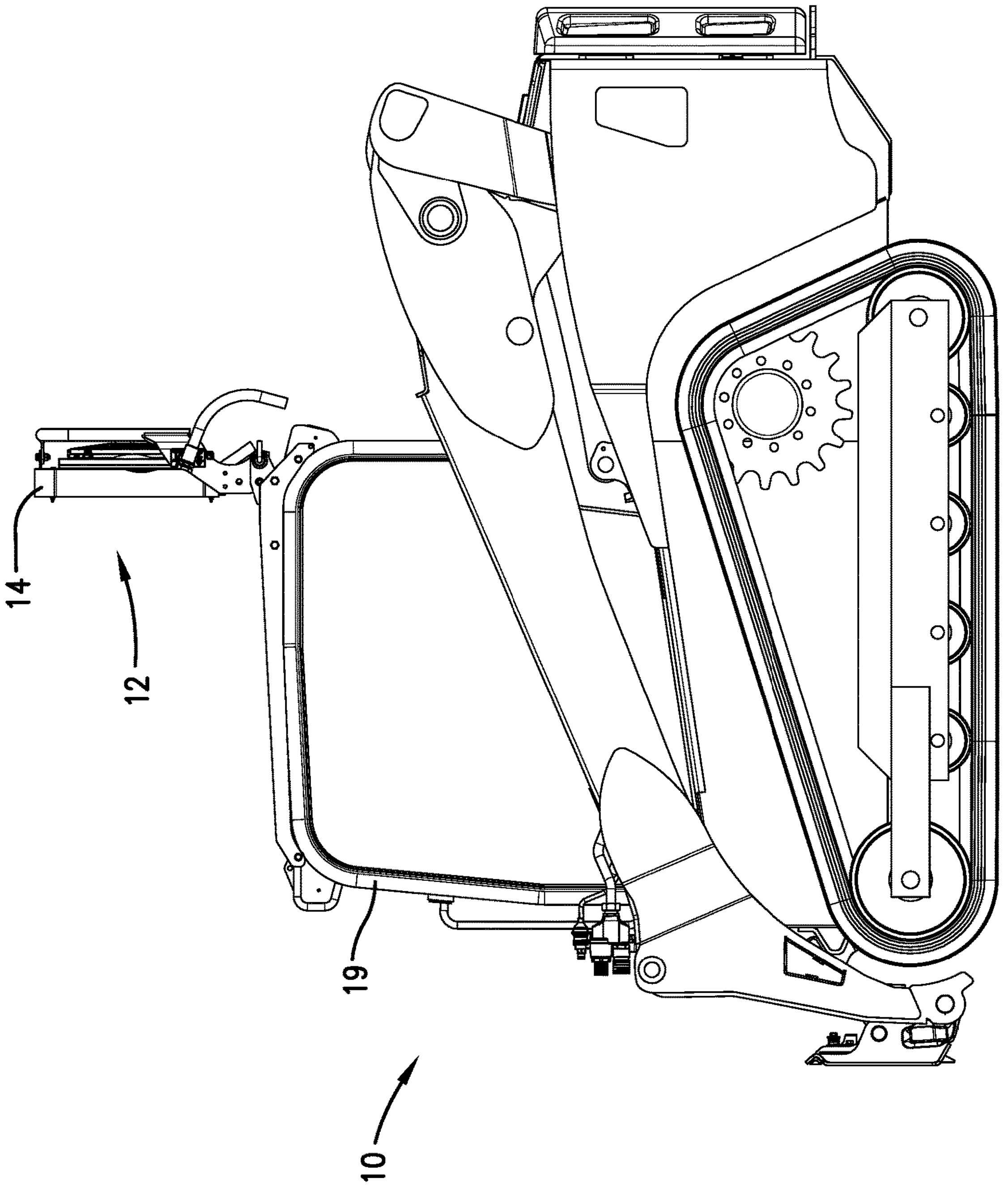
FIG. 10 is a side elevation view of the heavy-equipment machine and hydraulic cooling system from FIG. 9, with the hydraulic cooling system being positioned in a maintenance configuration.
Figure 11:
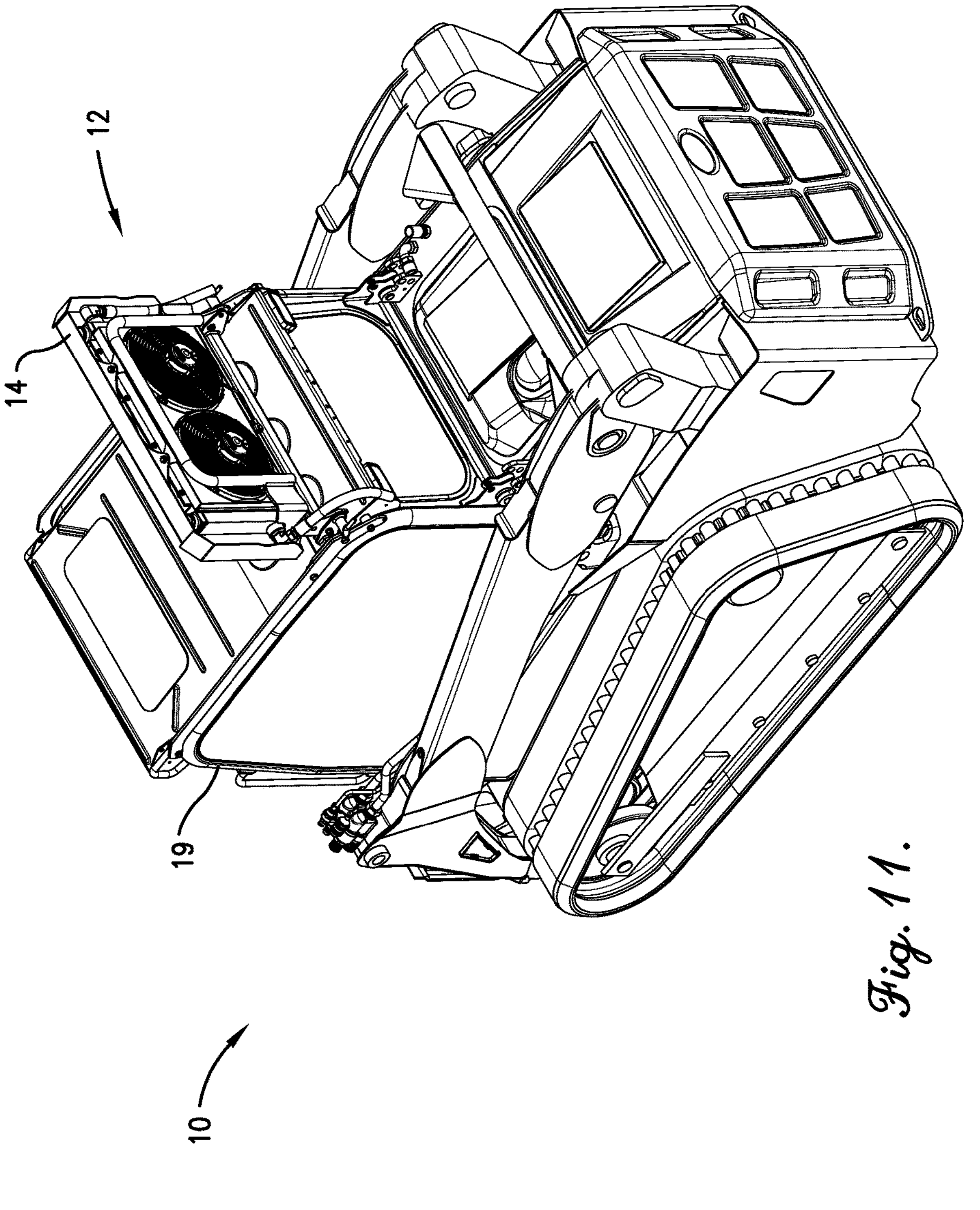
FIG. 11 is a rear perspective view of the heavy-equipment machine and hydraulic cooling system from FIG. 10.

FIG. 9 illustrates the hydraulic cooling system 12 in a normal operating configuration, with the main housing 14 extending rearward from the cab 19. Embodiments additionally provide, however, for the position of the hydraulic cooling system 12 to be adjusted to a maintenance configuration, as illustrated in FIGS. 10 and 11, with the main housing 14 rotated upward so as to extend upward from the cab 19. To facilitate such an adjustment, the hitch pins 66 (shown in FIG. 3) can be rotated and retracted from the main housing 14 and the attachment assembly 24, such that the main housing 14 is free to be rotated upward about the pivot elements 64. Once shifted upward to the maintenance configuration, the hitch pins 66 can be re-inserted within the main housing 14 and the attachment assembly 24 so as to secure the main housing 14 in place (i.e., extending upward from the cab 19). An opposite process can be performed to re-configure the hydraulic cooling system 12 from the maintenance configuration (e.g., FIGS. 10 and 11) to the normal operating configuration (e.g., FIG. 9).

Figure 12:
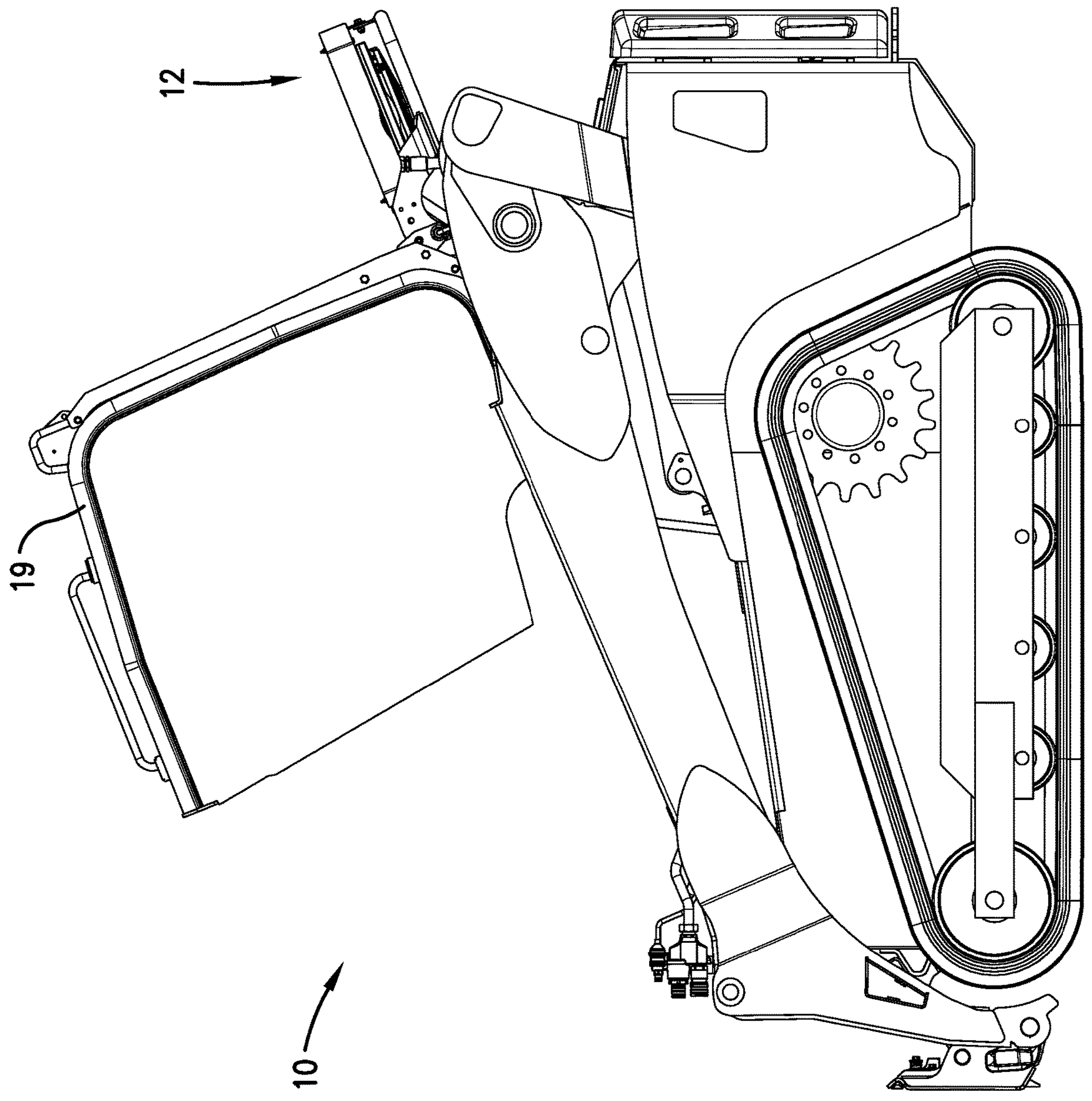
FIG. 12 is a side elevation view of the heavy-equipment machine and hydraulic cooling system from FIG. 10, with a cab of the heavy-equipment machine rotated rearward.
Figure 13:
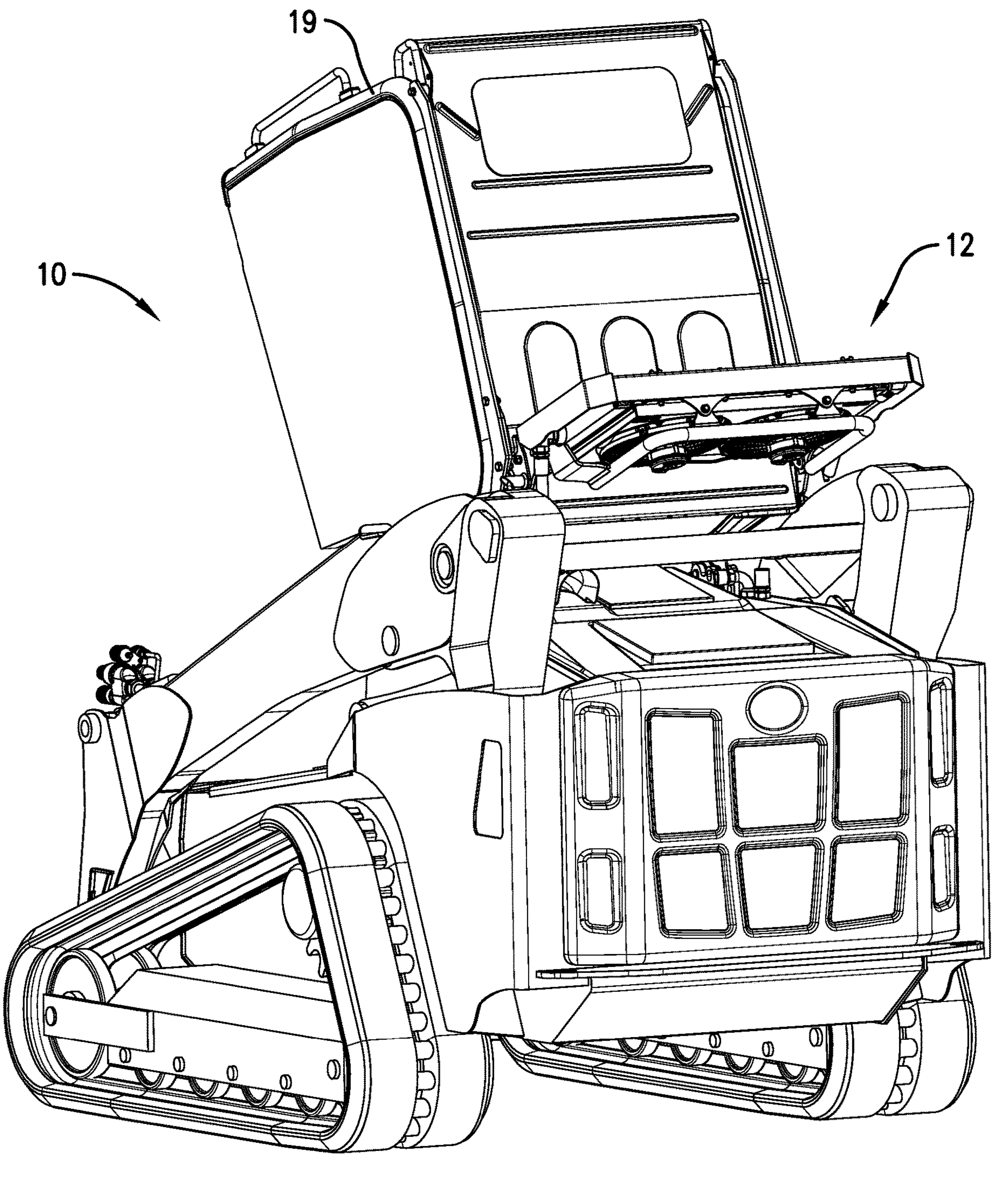
FIG. 13 is a rear perspective view of the heavy-equipment machine and hydraulic cooling system from FIG. 12.

The ability to adjust the hydraulic cooling system 12 between the normal operating configuration and the maintenance configuration provides various benefits, such as facilitating quick and efficient maintenance of the loader 10. For example, certain loaders, such as loader 10 shown in the drawings, permit their cabs to be shifted/rotated rearward to allow access to components beneath the cabs, such as to access the internal hydraulic systems. Embodiments of the present invention permit the cab 19 of the loader 10 to be shifted rearward without having to remove the hydraulic cooling system 12 from the cab 19. Specifically, if access beneath the loader's 10 cab 19 is required, the hydraulic cooling system 12 can be shifted from the normal operating configuration (i.e., with the main housing 14 extending rearward from the cab 19) shown in FIG. 9, to the maintenance configuration (i.e., with the main housing 14 extending upward from the cab 19) as shown in FIGS. 10 and 11. In such a maintenance configuration, the cab 19 can be rotated rearward, as illustrated in FIGS. 12 and 13 without the hydraulic cooling system 12 interfering with rear portions of the loader 10. With the cab 19 rotated rearward, a user/operator can access interior components of the loader 10, underneath the cab 19 (e.g., the hydraulic system), for purposes of maintenance, repair, and the like.

Embodiments of the present invention additionally include a method for installing the hydraulic cooling system 12 on the loader 10. One step may include securing the attachment assembly 24 to the cab 19 of the loader 10. As described above, the support arms 60 may be secured to the roof 20 of the cab 19 via fasteners. Upon securing the attachment assembly 24 to the cab 19, the main housing 14 may be rotatably secured to the attachment assembly 24 via the pivot pins 64 and hitch pins 66. In some embodiments, however, the main housing 14 and the attachment assembly 24 may pre-assembled together, such that the combined main housing 14 and attachment assembly 24 may simultaneously be secured to the cab 19. Regardless, embodiments provide for the main housing 14 to be secured to the cab 19 such that the main housing 14 extends rearward from the cab 19. In addition, the main housing 14 will extend rearward from a position adjacent to the top or roof 20 of the cab 19. In some embodiments, the main housing 14 will, in the normal operating configuration, be positioned lower than a maximum height of the cab 19 (i.e., below the roof 20 of the cab 19). In additional embodiments, the main housing 14 will, in the normal operating configuration, be positioned at the same height as the maximum height of the cab 19 (i.e., even with the roof 20 of the cab 19). In further embodiments, the main housing 14 will, in the normal operating configuration, be positioned no more than twelve inches, no more than ten inches, no more than eight inches, no more than six inches, no more than five inches, no more than four inches, no more than three inches, no more than two inches, or no more than one inch above the maximum height of the cab 19 (i.e., above the roof 20 of the cab 19). In some embodiments, no portion of the hydraulic cooling system 12 will, in the normal operating configuration, be positioned no more than twelve inches, nor more than ten inches, no more than eight inches, no more than six inches, no more than five inches, no more than four inches, no more than three inches, no more than two inches, or no more than one inch above the maximum height of the cab 19 (i.e., above the roof 20 of the cab 19).

To complete the installation of the hydraulic cooling system 12, a hydraulic hose will be connected from the outlet of the hydraulic control valve 32 to the inlet port 50 of the cooling element 15 of the hydraulic cooling system 12. Finally, a hydraulic hose will be connected from the inlet of the reservoir 30 to the outlet port 52 of the cooling element 15 of the hydraulic cooling system 12.

With the hydraulic cooling system 12 secured to the loader 10, the hydraulic cooling system 12 can be used to cool the hydraulic oil when certain loader attachments 21 are used with the loader 10. Specifically, the hydraulic cooling system 12 may be beneficially used to cool hydraulic oil when high oil flow loader attachments 21 are being used by the loader 10, such as brooms, augers, rotary cutters, tillers, mulchers, rock wheels, stump grinders, breakers, vibratory rollers, or the like. With the hydraulic cooling system 12 integrated within the hydraulic system of the loader 10, as illustrated in FIG. 8, the hydraulic cooling system 12 can be configured to automatically cool hydraulic oil whenever the loader attachment 21 is being operated. In some embodiments, the hydraulic cooling system 12 may also be configured to automatically cool hydraulic oil whenever the loader cylinders 26 are being operated. As was described previously, in some embodiments, the fans 16 of the hydraulic cooling system 12 may only be activated if the temperature of the hydraulic oil exceeds a maximum operating temperature.

The hydraulic cooling system 12 of embodiments of the present invention provide numerous advantages over prior art cooling systems. As described in the Background section above, previous cooling systems were generally attached to a roof of a cab of a loader, such that the cooling systems would extend upward, significantly above the roof of the cab. As such, these prior art cooling systems would inhibit maneuverability of the loader, particularly in locations with low obstacles (e.g., low hanging branches or limbs in a forestry setting). Embodiments of the present invention overcome such deficiencies in the prior art by providing for the hydraulic cooling system 12 to extend rearward from the cab 19 of the loader 10. As such, the loader 10 of the present invention can have a lower profiled, and thus an enhanced maneuverability, over the prior art loaders and cooling systems.

In addition, by extending rearward from the cab 19, the hydraulic cooling system 12 can generate a more efficient air flow through the hydraulic cooling system 12. Specifically, there are no obstructions directly below the hydraulic cooling system 12 of embodiments of the present invention, whereas prior art cooling systems are positioned directly on top of the roof of the cab of the loader, whereby the roof can interfere with air flow through the cooling system. Having a more efficient air flow through the hydraulic cooling system 12 can also prevent over-pressurization of the hydraulic oil within the hydraulic cooling system 12. Nevertheless, to address any over-pressurization issues, embodiments of the present invention include the bypass channel, which can be used if the pressure of the hydraulic oil within the cooling element 15 exceeds the standard operating pressure by more than the maximum pressure threshold.

Similarly, by having the hydraulic cooling system 12 extend rearward from the cab 19, the opportunity for debris to become stuck between the loader 10 and the hydraulic cooling system 12 is reduced. In addition, the hydraulic cooling system 12, extending rearward from the cab 19, is more accessible for cleaning, maintenance, or repair of the hydraulic cooling system 12. Furthermore still, embodiments of the present invention provide for the hydraulic cooling system 12 to include features that make it easier to clean or perform maintenance/repairs. For instance, in some embodiments the upper housing section 42 may in some embodiments, be removable from the remaining portions of the hydraulic cooling system 12 so as to provide quick and efficient access to the fans 16 and/or the cooling element 15.

Finally, as discussed above, the ability of the hydraulic cooling system 12 to be selectively transitioned from the normal operating configuration to the maintenance configuration permits the cab 19 to be shifted rearward without interfering with other components of the loader 10. As such, access to internal components of the loader 10 (e.g., the hydraulic system) can be achieved without damaging the loader 10 or hydraulic cooling system 12, and/or without requiring the removal of the hydraulic cooling system 12.

Although the invention has been described with reference to the exemplary embodiments illustrated in the attached drawings, it is noted that equivalents may be employed and substitutions made herein without departing from the scope of the invention as recited in the claims. For example, FIGS. 14 and 15 illustrate additional embodiments of a hydraulic cooling system 72 according to embodiments of the present invention. In more detail, the hydraulic cooling system 72 may include a main housing 74 and an attachment assembly 76 that are similar to the corresponding components of the hydraulic cooling system 12 previously described. In contrast, however, the main housing 74 may be slidably engaged with the attachment assembly 76.

In more detail, the attachment assembly 76 may comprise a generally horizontal base platform 80 that can be attached to the roof 20 of the cab 19. In some embodiments, the base platform 80 may be connected to the support arms 60, which were described previously. Nevertheless, the base platform 80 may include a pair of vertical side sections 82 at its lateral sides. Each of the side sections 82 may include a cam groove 84 extending longitudinally through the side sections 82. In addition, the main housing 74 may comprise a pair of cam bearings 86 positioned at the sides of the main housing 74 adjacent a front of the main housing 74. As such, the main housing 74 can be slidably engaged with the attachment assembly 76 via engagement of the cam bearings 86 of the main housing 74 within the cam grooves 82 of the attachment assembly 76.

FIG. 14 shows the hydraulic cooling system 72 in a normal operating configuration, with the main housing 74 extending rearward from the cab 19. In such a configuration, the hydraulic cooling system 72 can generate an efficient airflow for cooling the hydraulic oil. The main housing 74 can be secured in such a position via the pair of hitch pins 66 previously described, which extend between portions of the main housing 74 and the attachment assembly 76 to secure such components together. In such a configuration (i.e., the normal operating configuration), the cam bearings 86 are generally positioned in a rearward portion of the cam grooves 84.

From the normal operating configuration, the hydraulic cooling system 72 can be transitioned to a maintenance configuration, as is illustrated in FIG. 15. Such a transition can be effectuated in a manner similar to that described above with respect to the hydraulic cooling system 12. Specifically, the hitch pins 66 can be retracted so as to release the main housing 74 from its securement with the attachment assembly 76. As such, the main housing 74 can be slid forward (i.e., via the cam bearings 86 sliding along the cam grooves 84) until the main housing 74 is positioned at least partly above the cab 19 of the loader 10. In such a configuration (i.e., the maintenance configuration), the cam bearings 86 are generally positioned in within front portion of the cam grooves 84. In some embodiments, when the main housing 74 is slid forward, the main housing 74 will also be rotated, at least partially, so as to extend upward from the cab 19.

With the hydraulic cooling system 72 in the maintenance configuration (as shown in FIG. 15), the cab 19 of the loader 10 can be shifted/rotated rearward so as to permit access to components of the loader 10 underneath the cab 19. Such access can be provided without requiring that the hydraulic cooling system 72 be removed from the loader 10, and/or without causing damage to the loader 10 and/or the hydraulic cooling system 72 (as was previously discussed) as the cab 19 is rotated rearward.

The invention claimed is:

1. A hydraulic cooling system for a heavy-equipment machine, with the heavy-equipment machine including a frame supported on the ground by a ground-drive assembly, a cab extending upward from the frame, and an attachment tool configured to perform work, wherein the hydraulic cooling system comprises:

a main housing;

a cooling assembly housed at least partly within said main housing, wherein said cooling assembly is configured to reduce a temperature of hydraulic oil flowing through said hydraulic cooling system; and an attachment assembly configured to attach said main housing to the cab of the heavy-equipment machine at a position adjacent to a roof of the cab, wherein said main housing is configured to extend rearward from the cab of the heavy-equipment machine.

2. The hydraulic cooling system of claim 1, wherein said hydraulic cooling system is configured such that said main housing does not extend more than five inches above a maximum height of the cab.

3. The hydraulic cooling system of claim 1, wherein said cooling assembly comprises a cooling element through which the hydraulic oil is configured to flow and one or more fans for directing air flow across the cooling element.

4. The hydraulic cooling system of claim 3, wherein said cooling element is positioned above said one or more fans.

5. The hydraulic cooling system of claim 1, wherein said main housing is rotatably connected to said attachment assembly.

6. The hydraulic cooling system of claim 5, wherein said hydraulic cooling system is shiftable from a normal operating configuration, in which the main housing extends rearward from the cab, to a maintenance configuration, in which the main housing extends upward from the cab.

7. The hydraulic cooling system of claim 1, wherein said attachment assembly comprises a pair of longitudinally-extending support arms configured to be secured to the cab and a laterally-extending base element extending between said support arms.

8. The hydraulic cooling system of claim 1, wherein the heavy-equipment machine is a tracked skid-steer loader.

9. The hydraulic cooling system of claim 1, wherein the attachment tool is selected from a rotary cutter and a mulcher.

10. A skid-steer loader comprising:

frame;

a ground-drive assembly configured to support said frame on the ground;

a cab extending upward from said frame;

a loader attachment configured to perform work; and a hydraulic cooling system including— a main housing, a cooling assembly housed at least partly within said main housing, wherein said cooling assembly is configured to reduce a temperature of hydraulic oil flowing through said hydraulic cooling system, an attachment assembly configured to attach said main housing to said cab of said skid-steer loader at a position adjacent to a roof of said cab, wherein said main housing is configured to extend rearward from said cab.

11. The skid-steer loader of claim 10, wherein no portion of said hydraulic cooling system extend more than five inches above a maximum height of said cab.

12. The skid-steer loader of claim 10, wherein said cooling assembly comprises a radiator through which the hydraulic oil is configured to flow and one or more fans for directing air flow across said radiator.

13. The skid-steer loader of claim 10, wherein said main housing is rotatably connected to said attachment assembly.

14. The skid-steer loader of claim 10, wherein said attachment assembly comprises a pair of longitudinally-extending support arms secured to said cab and a laterally-extending base element extending between said support arms.

15. A method of integrating a hydraulic cooling system with a heavy-equipment machine, wherein the heavy-equipment machine includes a frame supported on the ground by a ground-drive assembly, a cab extending upward from the frame, and an attachment tool for performing work, wherein said method comprises the steps of:

(a) securing an attachment assembly to a roof of the cab of the heavy-equipment machine;

(b) attaching a main housing to the attachment assembly, wherein the main housing includes a cooling element and one or more fans housed therein, wherein upon said attaching of step (b), the main housing extends rearward from the cab of the heavy-equipment machine; and (c) hydraulically connecting the hydraulic cooling system to a hydraulic system of the heavy-equipment machine.

16. The method of claim 15, wherein upon said attaching of step (b), no portion of the hydraulic cooling system extends more than five inches above a maximum height of the cab of the heavy-equipment machine.

17. The method of claim 15, wherein said attaching of step (b) comprises rotatably attaching the main housing to the attachment assembly such that the hydraulic cooling system is configured to be transitioned from a normal operating configuration, in which the main housing extends rearward from the cab, to a maintenance configuration, in which the main housing extends upward from the cab.

* * * * *